Patented Jan. 30, 1951

2,539,406

UNITED STATES PATENT OFFICE 2,539,406

1-FLUOROALKYLAMINO-2-TRIFLUORO-METHYL-4-ARYLAMINOANTHRAQUINONE COMPOUNDS

Joseph B. Dickey and Edmund B. Towne, Rochester, N. Y., assignor to Eastman Kodak Company, Rochester, N. Y., a corporation of New Jersey No Drawing. Application October 16, 1948,
Serial No. 55,012

6 Claims. (Cl. 260—380)

This invention relates to new anthraquinone compounds and their application to the art of dyeing or coloring.

We have discovered that the anthraquinone compounds having the formula:

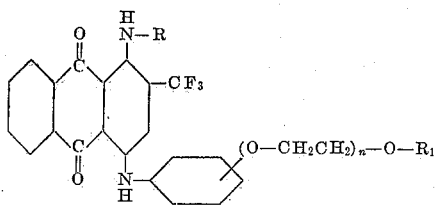

wherein R is a 2,2-difluoroethyl group, a 2,2-difluoropropyl group, a 3,3-difluoropropyl group, a 3,3-difluorobutyl group, a 2,2,2-trifluoroethyl group, a 3,3,3-trifluoropropyl group, an α-difluoromethylethyl group or an α-trifluoromethylethyl group, $R_1$ represents a hydrogen atom or an alkyl hydrocarbon group having from one to two, inclusive, carbon atoms and $n$ represents a small whole integer of from two to three, inclusive, are valuable dyes for coloring textile materials made of or containing a cellulose alkyl carboxylic acid ester having two to four carbon atoms in the acid groups thereof. They are particularly of use for the coloration of cellulose acetate textile materials.

It is an object of our invention to provide new anthraquinone dye compounds. Another object is to provide a satisfactory process for the preparation of the new anthraquinone dye compounds of the invention. A further object is to provide dyed cellulose alkyl carboxylic acid ester textile materials which possess good to excellent fastness to light and gas. A particular object is to provide new anthraquinone compounds which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate. Our new anthraquinone compounds color textile materials made of the aforesaid cellulose alkyl carboxylic acid esters blue, red-blue and greenish-blue shades.

The anthraquinone compounds of our invention are prepared by condensing an anthraquinone compound having the formula:

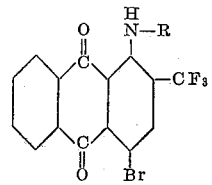

wherein R has the meaning previously assigned to it with a primary amine having the formula:

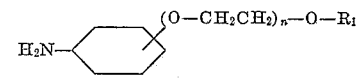

wherein $n$ and $R_1$ have the meaning previously assigned to them. The condensation reaction is ordinarily effected by heating the reaction mixture under refluxing conditions until the reaction is complete. Ordinarily a small excess of the aniline compound over that theoretically required is employed. Normally the reaction is carried out in the presence of an inert diluent such as n-amyl alcohol or n-butyl alcohol, the use of n-amyl alcohol being preferred. Similarly, an acid-binding agent such as potassium acetate is usually present during the reaction.

Normally the condensation reaction just referred to is carried out in the presence of a copper salt catalyst although in some instances the presence of a catalyst is not necessary. So far as we are aware, almost any cupric salt is useful as a catalyst. Thus, cupric sulfate (either with or without water of crystallization), cupric acetate, cupric bromide, cupric chloride and cupric iodide can be used. The use of cupric sulfate and cupric acetate is preferred.

As indicated in the examples, the dye compounds of our invention can be purified by means of a solvent for the dye such as toluene. Also, while the utility of the compounds of our invention will be illustrated with reference to the dyeing or coloration of cellulose acetate textile materials, it will be understood that they color the other textile materials referred to hereinbefore generally similar shades.

The following examples illustrate the anthraquinone compounds of our invention and the manner in which they may be prepared.

EXAMPLE 1

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 25 grams of o-aminophenyl-$\beta$-hydroxy-$\beta$-ethoxy-$\beta$-ethoxyethyl ether are placed in a suitable reaction vessel and heated to boiling for 4 to 5 hours. On cooling the reaction mixture, as by placing the reaction vessel in an ice bath, 1-2,2-difluoroethylamino-2-trifluoromethyl-4-(o-$\beta$-hydroxy-$\beta$-ethoxy-$\beta$-ethoxyethoxyphenyl) aminoanthraquinone having the formula:

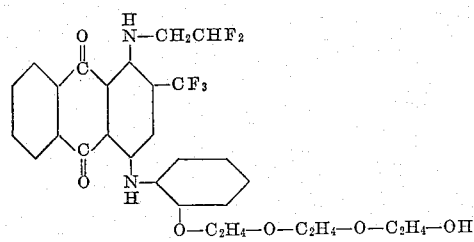

separates out as a heavy semi-crystalline solid and is recovered by filtration. The dye compound thus obtained is dissolved by adding 315 grams of toluene and heating to boiling and the resulting blue solution is filtered to remove insoluble material. The filtrate containing the dye in solution is cooled to 15° C. and 100 grams of petroleum ether are added with vigorous stirring over a 5 minute period. The dye compound separates as a solid and is recovered by filtration. It colors cellulose acetate textile materials blue shades. If for any reason the dye is not of the desired purity, the purification operation just described can be repeated.

EXAMPLE 2

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 25 grams of p-aminopenyl-$\beta$-hydroxy-$\beta$-ethoxy-$\beta$-ethoxyethylether are placed in a suitable reaction vessel and heated to boiling for 4 to 5 hours. On cooling the reaction mixture 1-2,2-difluoroethylamino-2-trifluoromethyl-4-(p-$\beta$-hydroxy-$\beta$-ethoxy-$\beta$-ethoxyethoxyphenyl) aminoanthraquinone having the formula:

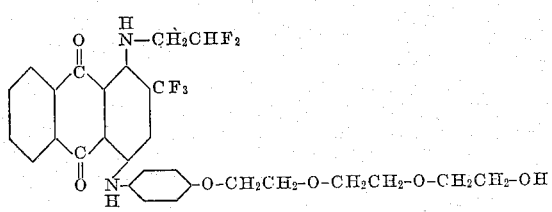

separates out as a heavy semi-crystalline solid and is recovered by filtration. The dye compound thus obtained is dissolved by adding 315 grams of toluene and heated to boiling and the resulting solution is filtered to remove insoluble material. The filtrate containing the dye in solution is cooled to 15° C. and 100 grams of petroleum ether are added with vigorous stirring over a 5 minute period. The dye compound separates as a solid and is recovered by filtration. It colors cellulose acetate textile materials blue shades. If for any reason the dye is not of the desired purity, the purification operation just described can be repeated.

EXAMPLE 3

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 25 grams of o-aminophenyl - $\beta$ - hydroxy - $\beta$ - ethoxy - $\beta$-ethoxyethyl ether are placed in a suitable reaction vessel and heated to boiling for 4 to 5 hours. On cooling the reaction mixture 1-2,2,2-trifluoroethylamino - 2 - trifluoromethyl - 4 - (o-$\beta$ - hydroxy-$\beta$-ethoxy-$\beta$-ethoxyethoxyphenyl) aminoanthraquinone having the formula:

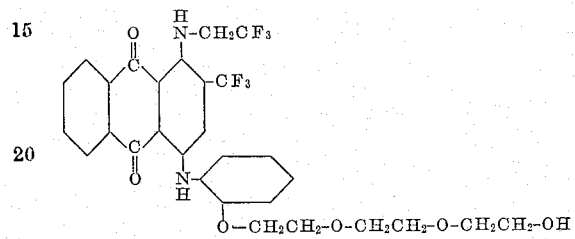

separates out as a heavy semi-crystalline solid and is recovered by filtration. The dye compound thus obtained is dissolved by adding 315 grams of toluene and heated to boiling and the resulting solution is filtered to remove insoluble material. The filtrate containing the dye in solution is cooled to 15° C. and 100 grams of petroleum ether are added with vigorous stirring over a 5 minute period. The dye compound separates as a solid and is recovered by filtration. It colors cellulose acetate textile materials red-blue shades. If for any reason the dye is not of the desired purity, the purification operation just described can be repeated.

EXAMPLE 4

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 25 grams of o - aminophenyl - $\beta$ - hydroxy - $\beta$ - ethoxy - $\beta$-ethoxyethyl ether are heated together and the reaction mixture is worked up as described in Example 1 to obtain 1-2,2,2-trifluoroethylamino-2 - trifluoromethyl - 4 - (p - $\beta$ - hydroxy - $\beta$-ethoxy - $\beta$ - ethoxyethoxyphenyl) aminoanthraquinone which colors cellulose acetate textile materials red-blue shades.

EXAMPLE 5

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 24 grams of o - aminophenyl - $\beta$ - hydroxy - $\beta$ - ethoxyethyl ether are heated together and the reaction mixture is worked up as described in Example 1 to obtain 1-2,2-difluoroethylamino-2-trifluoromethyl-4-(o-$\beta$-hydroxy-$\beta$ - ethoxyethoxyphenyl) aminoanthraquinone which colors cellulose acetate textile materials blue shades.

By the use of 24 grams of m-aminophenyl-$\beta$-hydroxy-$\beta$-ethoxyethyl ether in place of o-aminophenyl-$\beta$-hydroxy-$\beta$-ethoxyethyl ether in the foregoing example 1-2,2-difluoroethylamino-2-trifluoromethyl - 4 - (m - $\beta$ - hydroxy - $\beta$ - ethoxyethoxyphenyl) aminoanthraquinone which colors cellulose acetate textile materials blue shades is obtained.

EXAMPLE 6

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 24 grams of o-aminophenyl-$\beta$-hydroxy-$\beta$-ethoxyethyl ether are heated together and the reaction mixture is worked up as described in Example 1 to obtain 1-2,2,2-trifluoroethylamino - 2 - trifluoromethyl - 4 - (o-$\beta$ - hydroxy - $\beta$ - ethoxyethoxyphenyl) aminoanthraquinone which colors cellulose acetate textile materials blue shades.

By the use of 24 grams of m-aminophenyl-$\beta$-hydroxy-$\beta$-ethoxyethyl ether in place of o-aminophenyl-$\beta$-hydroxy-$\beta$-ethoxyethyl ether in the foregoing example 1-2,2,2-trifluoroethylamino-2 - trifluoromethyl - 4 - (m - $\beta$ - hydroxy - $\beta$-ethoxyethoxyphenyl) aminoanthraquinone which colors cellulose acetate textile materials blue shades is obtained.

EXAMPLE 7

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 24 grams of p-aminophenyl-$\beta$-hydroxy-$\beta$-ethoxyethyl ether are heated together and the reaction mixture is worked up as described in Example 1 to obtain 1 - 2,2 - difluoroethylamino - 2 - trifluoromethyl-4-(p-$\beta$-hydroxy-$\beta$-ethoxyethoxyphenyl) aminoanthraquinone which colors cellulose acetate textile materials blue shades.

By the use of 44.5 grams of 1-2,2-difluoropropylamino - 2 - trifluoromethyl - 4 - bromoanthraquinone in place of 1-2,2-difluoroethylamino-2-trifluoromethyl-4-bromoanthraquinone in the foregoing example 1-2,2-difluoropropylamino-2-trifluoromethyl - 4 - (p - $\beta$ - hydroxy - $\beta$ - ethoxyethoxyphenyl) aminoanthraquinone which colors cellulose acetate textile materials blue shades is obtained.

EXAMPLE 8

43 grams of 1-2,2,2-trifluoroethylamino-2-trifluoromethyl-4-bromonanthraquinone, 500 cc. of n-amyl alcohol, 1 gram of copper sulfate, 15 grams of potassium acetate and 24 grams of p-aminophenyl-$\beta$-hydroxy-$\beta$-ethoxyethyl ether are heated together and the reaction mixture is worked up as described in Example 1 to obtain 1-2,2,2-trifluoroethylamino-2-trifluoromethyl-4-(p-$\beta$-hydroxy-$\beta$-ethoxyethoxyphenyl) aminoanthraquinone which colors cellulose acetate textile materials blue shades.

By the use of 46 grams of 1-3,3-difluorobutylamino-2-trifluoromethyl-4-bromoanthraquinone in place of 1-2,2,2-trifluoroethylamino-2-trifluoromethyl-4-bromoanthraquinone in the foregoing example 1-3,3-difluorobutylamino-2-trifluoromethyl-4-(p-$\beta$-hydroxy-$\beta$-ethoxyethoxyphenyl) aminoanthraquinone which colors cellulose acetate textile materials blue shades is obtained.

EXAMPLE 9

43.6 grams of 1-2,2-difluoropropylamino-2-trifluoromethyl-4-bromoanthraquinone, 500 cc. of n-amyl alcohol, 1 gram of copper sulfate, 15 grams of potassium acetate and 25 grams of o-aminophenyl-$\beta$-hydroxy-$\beta$-ethoxy-$\beta$-ethoxyethyl ether are heated together and the reaction mixture is worked up as described in Example 1 to obtain 1-2,2-difluoropropylamino-2-trifluoromethyl-4-(o-$\beta$-hydroxy-$\beta$-ethoxy-$\beta$-ethoxyethoxyphenyl) aminoanthraquinone which colors cellulose acetate textile materials blue shades.

By the use of 25 grams of p-aminophenyl-$\beta$-hydroxy-$\beta$-ethoxy-$\beta$-ethoxyethyl ether in place of o-aminophenyl-$\beta$-hydroxy-$\beta$-ethoxy-$\beta$-ethoxyethyl ether in the foregoing example 1-2,2-difluoropropylamino - 2 - trifluoromethyl - 4 - (p - $\beta$-hydroxy-$\beta$-ethoxy-$\beta$-ethoxyethoxyphenyl) aminoanthraquinone which colors cellulose acetate textile materials blue shades is obtained.

EXAMPLE 10

44.5 grams of 1-3,3-difluoropropylamino-2-trifluoromethyl-4-bromoanthraquinone, 500 cc. of n-amyl alcohol, 1 gram of copper sulfate, 15 grams of potassium acetate and 25 grams of o - aminophenyl - $\beta$ - hydroxy - $\beta$ - ethoxy - $\beta$-ethoxyethyl ether are heated together and the reaction mixture is worked up as described in Example 1 to obtain 1-3,3-difluoropropylamino-2 - trifluoromethyl - 4 - (o - $\beta$ - hydroxy - $\beta$ - ethoxy-$\beta$-ethoxyethoxyphenyl) aminoanthraquinone which colors cellulose acetate textile materials blue shades.

By the use of 25 grams of p-aminophenyl-$\beta$-hydroxy-$\beta$-ethoxy-$\beta$-ethoxyethyl ether in place of o-aminophenyl-$\beta$-hydroxy-$\beta$-ethoxy-$\beta$-ethoxyethyl ether in the foregoing example 1-3,3-difluoropropylamino - 2 - trifluoromethyl - 4 - (p - $\beta$-hydroxy-$\beta$-ethoxy-$\beta$-ethoxyethoxyphenyl) aminoanthraquinone which colors cellulose acetate textile materials blue shades is obtained.

EXAMPLE 11

46 grams of 1-3,3,3-trifluoropropylamino-2-trifluoromethyl-4-bromoanthraquinone, 500 cc. of n-amyl alcohol, 1 gram of copper sulfate, 15 grams of potassium acetate and 25 grams of o - aminophenyl - $\beta$ - hydroxy - $\beta$ - ethoxy - $\beta$-ethoxyethyl ether are heated together and the reaction mixture is worked up as described in Example 1 to obtain 1-3,3,3-trifluoropropylamino-2 - trifluoromethyl - 4 - (o - $\beta$ - hydroxy - $\beta$ - ethoxy-$\beta$-ethoxyethoxyphenyl) aminoanthraquinone which colors cellulose acetate textile materials blue shades.

By the use of 25 grams of p-aminophenyl-$\beta$-hydroxy-$\beta$-ethoxy-$\beta$-ethoxyethyl ether in place of o-aminophenyl-$\beta$-hydroxy-$\beta$-ethoxy-$\beta$-ethoxyethyl ether in the foregoing example 1-3,3,3-trifluoropropylamino-2-trifluoromethyl-4-(p-$\beta$-hydroxy-$\beta$-ethoxy-$\beta$-ethoxyethoxyphenyl) aminoanthraquinone which colors cellulose acetate textile materials blue shades is obtained.

EXAMPLE 12

46 grams of 1-3,3-difluorobutylamino-2-trifluoromethyl-4-bromoanthraquinone, 500 cc. of n-amyl alcohol, 1 gram of copper sulfate, 15 grams of potassium acetate and 25 grams of o - aminophenyl - $\beta$ - hydroxy - $\beta$ - ethoxy - $\beta$-ethoxyethyl ether are heated together and the reaction mixture is worked up as described in Example 1 to obtain 1-3,3-difluorobutylamino-2-trifluoromethyl - 4 - (o - $\beta$ - hydroxy - $\beta$ - ethoxy-$\beta$ - ethoxyethoxyphenyl) aminoanthraquinone which colors cellulose acetate textile materials blue shades.

By the use of 25 grams of p-aminophenyl-$\beta$-hydroxy-$\beta$-ethoxy-$\beta$-ethoxyethyl ether in place of o-aminophenyl-$\beta$-hydroxy-$\beta$-ethoxy-$\beta$-ethoxyethyl ether in the foregoing example of 1-3,3-difluorobutylamino - 2 - trifluoromethyl-4-(p-$\beta$-hydroxy-$\beta$-ethoxy-$\beta$-ethoxyethoxyphenyl) aminoanthraquinone which colors cellulose acetate textile materials blue shades is obtained.

EXAMPLE 13

44.5 grams of 1-α-difluoromethylethylamino-2-trifluoromethyl-4-bromoanthraquinone, 500 cc. of n-amyl alcohol, 1 gram of copper sulfate, 15 grams of potassium acetate and 25 grams of o-aminophenyl-β-hydroxy-β-ethoxy - β - ethoxyethyl ether are heated together and the reaction mixture is worked up as described in Example 1 to obtain 1-α-difluoromethylethylamino - 2 - trifluoromethyl-4-(o-β-hydroxy-β-ethoxy-β-ethoxyethoxyphenyl) aminoanthraquinone which colors cellulose acetate textile materials blue shades.

By the use of 25 grams of p-aminophenyl-β-hydroxy-β-ethoxy-β-ethoxyethyl ether in place of o-aminophenyl-β-hydroxy-β-ethoxy-β-ethoxyethyl ether in the foregoing example 1-α-difluoromethylethylamino-2-trifluoromethyl-4-(p - β-hydroxy-β-ethoxy-β-ethoxyethoxyphenyl) aminoanthraquinone which colors cellulose acetate textile materials blue shades is obtained.

EXAMPLE 14

46 grams of 1-α-trifluoromethylethylamino-2-trifluoromethyl-4-bromoanthraquinone, 500 cc. of n-amyl alcohol, 1 gram of copper sulfate, 15 grams of potassium acetate and 25 grams of o-aminophenyl-β-hydroxy-β-ethoxy - β - ethoxyethyl ether are heated together and the reaction mixture is worked up as described in Example 1 to obtain 1-α-trifluoromethylethylamino-2-trifluoromethyl-4-(o-β-hydroxy-β-ethoxy-β-ethoxyethoxyphenyl) aminoanthraquinone which colors cellulose acetate textile materials blue shades.

By the use of 25 grams of p-aminophenyl-β-hydroxy-β-ethoxy-β-ethoxyethyl ether in place of o-aminophenyl-β-hydroxy-β-ethoxy - β - ethoxyethyl ether in the foregoing example 1-α-trifluoromethylethylamino-2-trifluoromethyl-4-(p - β-hydroxy-β-ethoxy - β - ethoxyethoxyphenyl) aminoanthraquinone which colors cellulose acetate textile materials blue shades is obtained.

EXAMPLE 15

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 26.5 grams of o-aminophenyl-β-methoxy - β - ethoxyethyl ether are heated together and the reaction mixture is worked up as described in Example 1 to obtain 1-2,2-difluoroethylamino - 2 - trifluoromethyl-4-(o-β-methoxy-β-ethoxyethoxyphenyl) aminoanthraquinone which colors cellulose acetate textile materials blue shades.

By the use of 26.5 grams of p-aminophenyl-β-methoxy-β-ethoxyethyl ether in place of o-aminophenyl-β-methoxy-β-ethoxyethyl ether in the foregoing example 1-2,2 - difluoroethylamino-2-trifluoromethyl-4-(p-β-methoxy-β-ethoxyethoxyphenyl) aminoanthraquinone which colors cellulose acetate textile materials blue shades is obtained.

EXAMPLE 16

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 26.5 grams of o-aminophenyl-β-methoxy - β - ethoxyethyl ether are heated together and the reaction mixture is worked up as described in Example 1 to obtain 1-2,2,2 - trifluoroethylamino-2-trifluoromethyl-4-(o-β-methoxy-β-ethoxyethoxyphenyl) aminoanthraquinone which colors cellulose acetate textile materials red-blue shades.

By the use of 26.5 grams of p-aminophenyl-β-methoxy-β-ethoxyethyl ether in place of o-aminophenyl-β-methoxy-β-ethoxyethyl ether in the foregoing example 1-2,2,2-trifluoroethylamino-2-trifluoromethyl-4-(p-β-methoxy - β - ethoxyethoxyphenyl) aminoanthraquinone which colors cellulose acetate textile materials red-blue shades is obtained.

EXAMPLE 17

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 30 grams of p-aminophenyl-β-ethoxy-β-ethoxy - β - ethoxyethyl ether are heated together and the reaction mixture is worked up as described in Example 1 to obtain 1-2,2-difluoroethylamino-2-trifluoromethyl-4-(p-β-ethoxy-β-ethoxy-β-ethoxyethoxyphenyl) aminoanthraquinone which colors cellulose acetate textile materials blue shades.

By the use of 30 grams of o-aminophenyl-β-ethoxy-β-ethoxy-β-ethoxyethyl ether in place of p-aminophenyl-β-ethoxy-β-ethoxy - β - ethoxyethyl ether in the foregoing example 1-2,2-difluoroethylamino - 2 - trifluoromethyl - 4 - (o-β-ethoxy-β-ethoxy-β-ethoxyethoxyphenyl) aminoanthraquinone which colors cellulose acetate textile materials blue shades is obtained.

EXAMPLE 18

42 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 30 grams of p-aminophenyl-β-ethoxy-β-ethoxy - β - ethoxyethyl ether are heated together and the reaction mixture is worked up as described in Example 1 to obtain 1-2,2,2-trifluoroethylamino - 2 - trifluoromethyl-4-(p-β-ethoxy-β-ethoxy-β-ethoxyethoxyphenyl) aminoanthraquinone which colors cellulose acetate textile materials red-blue shades.

By the use of 30 grams of o-aminophenyl-β-ethoxy-β-ethoxy-β-ethoxyethyl ether in place of p-aminophenyl - β - ethoxy- β -ethoxy-β-ethoxyethyl ether in the foregoing example 1-2,2,2-trifluoroethylamino- 2 -trifluoromethyl - 4 - (o-β-ethoxy-β-ethoxy-β-ethoxyethoxyphenyl) aminoanthraquinone which colors cellulose acetate textile materials red-blue shades is obtained.

EXAMPLE 19

42.2 grams of 1 - 2,2 - difluoroethylamino - 2 - trifluoromethyl-4-bromoanthraquinone, 500 cc. of n-amyl alcohol, 1 gram of copper sulfate, 15 grams of potassium acetate and 29 grams of o-aminophenyl- β -methoxy-β-ethoxy-β-ethoxyethyl ether are heated together and the reaction mixture is worked up as described in Example 1 to obtain 1-2,2-difluoroethylamino-2-trifluoromethyl - 4-(o-β-methoxy-β-ethoxy-β-ethoxyethoxyphenyl) aminoanthraquinone which colors cellulose acetate textile materials blue shades.

By the use of 28 grams of o-aminophenyl-β-ethoxy-β-ethoxyethyl ether in place of o-aminophenyl-β-methoxy-β-ethoxy-β-ethoxyethyl ether in the foregoing example 1-2,2-difluoroethylamino - 2 - trifluoromethyl-4-(o-β-ethoxy-β-ethoxyethoxyphenyl) aminoanthraquinone which colors cellulose acetate textile materials blue shades is obtained.

EXAMPLE 20

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 29 grams of o-aminophenyl-β-methoxy-β-ethoxy-β-ethoxyethyl ether are heated together and the reaction mixture is worked up as described in Example 1 to obtain 1-2,2,2-trifluoroethylamino-2-trifluoromethyl - 4-(o-β-methoxy-β-ethoxy-β-ethoxyethoxyphenyl) aminoanthraquinone which colors cellulose acetate textile materials red-blue shades.

By the use of 28 grams of o-aminophenyl-β-ethoxy-β-ethoxyethyl ether in place of o-aminophenyl-β-methoxy-β-ethoxy-β-ethoxyethyl ether in the foregoing example 1-2,2,2-trifluoroethylamino - 2 - trifluoromethyl-4-(o-β-ethoxy-β-ethoxyethoxyphenyl) aminoanthraquinone which colors cellulose acetate textile materials red-blue shades is obtained.

EXAMPLE 21

44.5 grams of 1-2,2-difluoropropylamino-2-trifluoromethyl-4-bromoanthraquinone, 500 cc. of n-amyl alcohol, 1 gram of copper sulfate, 15 grams of potassium acetate and 30 grams of o-aminophenyl -β- ethoxy - β - ethoxy-β-ethoxyethyl ether are heated together and the reaction mixture is worked up as described in Example 1 to obtain 1-2,2-difluoropropylamino-2-trifluoromethyl-4-(o-β-ethoxy-β-ethoxy-β-ethoxyethoxyphenyl) aminoanthraquinone which colors cellulose acetate textile materials blue shades.

By the use of 30 grams of p-aminophenyl-β-ethoxy-β-ethoxy-β-ethoxyethyl ether in place of o-aminophenyl - β - ethoxy- β -ethoxy-β-ethoxyethyl ether in the foregoing example 1-2,2-difluoropropylamino - 2 - trifluoromethyl - 4 -(p-β-ethoxy - β - ethoxy - β - ethoxyethoxyphenyl) aminoanthraquinone which colors cellulose acetate textile materials blue shades is obtained.

EXAMPLE 22

46 grams of 1-3,3,3-trifluoropropylamino-2-trifluoromethyl-4-bromoanthraquinone, 500 cc. of n-amyl alcohol, 1 gram of copper sulfate, 15 grams of potassium acetate and 30 grams of o - aminophenyl - β - ethoxy-β-ethoxy-β-ethoxyethyl ether are heated together and the reaction mixture is worked up as described in Example 1 to obtain 1-3,3,3-trifluoroethylamino-2-trifluoromethyl - 4 -(o-β-ethoxy-β - ethoxyethoxyphenyl) aminoanthraquinone which colors cellulose acetate textile materials blue shades.

By the use of 30 grams of p-aminophenyl-β-ethoxy-β-ethoxy-β-ethoxyethyl ether in place of o-aminophenyl-β-ethoxy-β-ethoxy-β-ethoxyethyl ether in the foregoing example 1-3,3,3-trifluoropropylamino - 2 - trifluoromethyl - 4 -(p-β-ethoxy-β-ethoxy-β-ethoxyethoxyphenyl) aminoanthraquinone which colors cellulose acetate textile materials blue shades is obtained.

EXAMPLE 23

44.5 grams of 1-3,3-difluoropropylamino-2-trifluoromethyl-4-bromoanthraquinone, 500 cc. of n-amyl alcohol, 1 gram of copper sulfate, 15 grams of potassium acetate and 28 grams of o-aminophenyl - β - ethoxy-β-ethoxyethyl ether are heated together and the reaction mixture is worked up as described in Example 1 to obtain 1-3,3 - difluoropropylamino-2-trifluoromethyl-4-(o -β- ethoxy-β-ethoxyethoxyphenyl) aminoanthraquinone which colors cellulose acetate textile materials greenish-blue shades.

By the use of 28 grams of p-aminophenyl-β-ethoxy-β-ethoxyethyl ether in place of o-aminophenyl - β - ethoxy - β - ethoxyethyl ether in the foregoing example 1-3,3-difluoropropylamino-2-trifluoromethyl - 4 -(p-β-ethoxy-β-ethoxyethoxyphenyl) aminoanthraquinone which colors cellulose acetate textile materials greenish-blue shades is obtained.

EXAMPLE 24

46 grams of 1-3,3-difluorobutylamino-2-trifluoromethyl-4-bromoanthraquinone, 500 cc. of n-amyl alcohol, 1 gram of copper sulfate, 15 grams of potassium acetate and 28 grams of o-aminophenyl - β - ethoxy-β-ethoxyethyl ether are heated together and the reaction mixture is worked up as described in Example 1 to obtain 1-3,3-difluorobutylamino - 2 - trifluoromethyl-4-(o - β - ethoxy-β-ethoxyethoxyphenyl) aminoanthraquinone which colors cellulose acetate textile materials greenish-blue shades.

By the use of 28 grams of p-aminophenyl-β-ethoxy-β-ethoxyethyl ether in place of o-aminophenyl-β-ethoxy-β-ethoxyethyl ether in the foregoing example 1-3,3-difluorobutylamino-2-trifluoromethyl-4-(p-β-ethoxy-β-ethoxyethoxyphenyl) aminoanthraquinone which colors cellulose acetate textile materials greenish-blue shades is obtained.

EXAMPLE 25

44.5 grams of 1-α-difluoromethylethylamino-2-trifluoromethyl-4-bromoanthraquinone, 500 cc. of n-amyl alcohol, 1 gram of copper sulfate, 15 grams of potassium acetate and 26.5 grams of o - aminophenyl-β-methoxy-β-ethoxyethyl ether are heated together and the reaction mixture is worked up as described in Example 1 to obtain 1-α-difluoromethylethylamino-2-trifluoromethyl-4-(o-β-methoxy-β - ethoxyethoxyphenyl) aminoanthraquinone which colors cellulose acetate textile materials blue shades. The dye compound obtained has the formula:

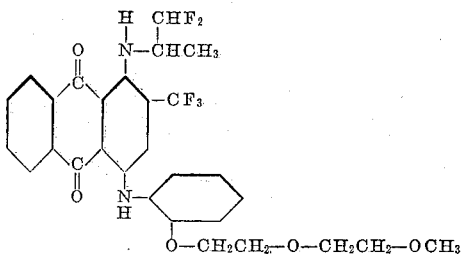

By the use of 26.5 grams of p-aminophenyl-β-methoxy-β-ethoxyethyl ether in place of o-aminophenyl-β-methoxy-β-ethoxyethyl ether in the foregoing example 1-α-difluoromethylethylamino-2-trifluoromethyl - 4-(p-β-methoxy - β - ethoxyethoxyphenyl) aminoanthraquinone which colors cellulose acetate textile materials blue shades is obtained.

EXAMPLE 26

46 grams of 1-α-trifluoromethylethylamino-2-trifluoromethyl-4-bromoanthraquinone, 500 cc. of n-amyl alcohol, 1 gram of copper sulfate, 15 grams of potassium acetate and 26.5 grams of o - aminophenyl-β-methoxy-β-ethoxyethyl ether are heated together and the reaction mixture is worked up as described in Example 1 to obtain 1-α-trifluoromethylethylamino - 2-trifluoromethyl-4-(o-β-methoxy-β - ethoxyethoxyphenyl) amino-anthraquinone which colors cellulose acetate textile materials blue shades. The dye compound obtained has the formula:

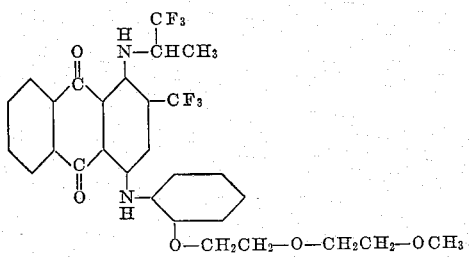

By the use of 26.5 grams of p-aminophenyl-β-methoxy-β-ethoxyethyl ether in place of o-aminophenyl-β-methoxy-β-ethoxyethyl ether in the foregoing example 1-α-trifluoromethylethylamino-2-trifluoromethyl-4-(p-β-methoxy-β-ethoxyethoxyphenyl) aminoanthraquinone which colors cellulose acetate textile materials blue shades is obtained.

EXAMPLE 27

44.5 grams of 1-α-difluoromethylethylamino-2-trifluoromethyl-4-bromoanthraquinone, 500 cc. of n-amyl alcohol, 1 gram of copper sulfate, 15 grams of potassium acetate and 24 grams of p-aminophenyl-β-hydroxy-β-ethoxyethyl ether are heated together and the reaction mixture is worked up as described in Example 1 to obtain 1-α-difluoromethylethylamino-2-trifluoromethyl-4-(p-β-hydroxy-β-ethoxyethoxyphenyl) aminoanthraquinone which colors cellulose acetate textile materials blue shades.

By the use of 24 grams of o-aminophenyl-β-hydroxy-β-ethoxyethyl ether in place of p-aminophenyl-β-hydroxy-β-ethoxyethyl ether in the foregoing example 1-α-difluoromethylethylamino-2-trifluoromethyl-4-(o-β-hydroxy-β-ethoxyethoxyphenyl) aminoanthraquinone which colors cellulose acetate textile materials blue shades is obtained.

EXAMPLE 28

46 grams of 1-α-trifluoromethylethylamino-2-trifluoromethyl-4-bromoanthraquinone, 500 cc. of n-amyl alcohol, 1 gram of copper sulfate, 15 grams of potassium acetate and 24 grams of p-aminophenyl-β-hydroxy-β-ethoxyethyl ether are heated together and the reaction mixture is worked up as described in Example 1 to obtain 1-α-trifluoromethylethylamino-2-trifluoromethyl-4-(p-β-hydroxy-β-ethoxyethoxyphenyl) aminoanthraquinone which colors cellulose acetate textile materials blue shades.

By the use of 24 grams of o-aminophenyl-β-hydroxy-β-ethoxyethyl ether in place of p-aminophenyl-β-hydroxy-β-ethoxyethyl ether in the foregoing example 1-α-trifluoromethylethylamino-2-trifluoromethyl-4-(o-β-hydroxy-β-ethoxyethoxyphenyl) aminoanthraquinone which colors cellulose acetate textile materials blue shades is obtained.

EXAMPLE 29

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 25 grams of m-aminophenyl-β-hydroxy-β-ethoxy-β-ethoxyethyl ether are heated together and the reaction mixture is worked up as described in Example 1 to obtain 1-2,2-difluoroethylamino-2-trifluoromethyl-4-(m-β-hydroxy-β-ethoxy-β-ethoxyethoxyphenyl) aminoanthraquinone which colors cellulose acetate textile materials blue shades.

By the use of 43 grams of 1-2,2,2-trifluoroethylamino-2-trifluoromethyl-4-bromoanthraquinone in place of 1-2,2-difluoroethylamino-2-trifluoromethyl-4-bromoanthraquinone in the foregoing example 1-2,2,2-trifluoroethylamino-2-trifluoromethyl-4-(m-β-hydroxy-β-ethoxy-β-ethoxyethoxyphenyl) aminoanthraquinone which colors cellulose acetate textile materials blue shades is obtained.

EXAMPLE 30

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 26.5 grams of m-aminophenyl-β-methoxy-β-ethoxyethyl ether are heated together and the reaction mixture is worked up as described in Example 1 to obtain 1-2,2-difluoroethylamino-2-trifluoromethyl-4-(m-β-methoxy-β-ethoxyethoxyphenyl) aminoanthraquinone which colors cellulose acetate textile materials blue shades.

By the use of 43 grams of 1-2,2,2-trifluoroethylamino-2-trifluoromethyl-4-bromoanthraquinone in place of 1-2,2-difluoroethylamino-2-trifluoromethyl-4-bromoanthraquinone in the foregoing example 1-2,2,2-trifluoroethylamino-2-trifluoromethyl-4-(m-β-methoxy-β-ethoxyethoxyphenyl) aminoanthraquinone which colors cellulose acetate textile materials blue shades is obtained.

EXAMPLE 31

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 28 grams of m-aminophenyl-β-ethoxy-β-ethoxyethyl ether are heated together and the reaction mixture is worked up as described in Example 1 to obtain 1-2,2-difluoroethylamino-2-trifluoromethyl-4-(m-β-ethoxy-β-ethoxyethoxyphenyl) aminoanthraquinone which colors cellulose acetate textile materials blue shades.

By the use of 28 grams of p-aminophenyl-β-ethoxy-β-ethoxyethyl ether in place of m-aminophenyl-β-ethoxy-β-ethoxyethyl ether in the foregoing example 1-2,2-difluoroethylamino-2-trifluoromethyl-4-(p-β-ethoxy-β-ethoxyethoxyphenyl) aminoanthraquinone which colors cellulose acetate textile materials blue shades is obtained.

EXAMPLE 32

43 grams of 1-2,2,2-trifluoroethylamino-2-trifluoromethyl-4-bromoanthraquinone, 500 cc. of n-amyl alcohol, 1 gram of copper sulfate, 15 grams of potassium acetate and 28 grams of m-aminophenyl-β-ethoxy-β-ethoxyethyl ether are heated together and the reaction mixture is worked up as described in Example 1 to obtain 1-2,2,2-trifluoroethylamino-2-trifluoromethyl-4-(m-β-ethoxy-β-ethoxyethoxyphenyl) aminoanthraquinone which colors cellulose acetate textile materials red-blue shades.

By the use of 28 grams of p-aminophenyl-β-ethoxy-β-ethoxyethyl ether in place of m-aminophenyl-β-ethoxy-β-ethoxyethyl ether in the foregoing example 1-2,2,2-trifluoroethylamino-2-trifluoromethyl-4-(p-β-ethoxy-β-ethoxyethoxyphenyl) aminoanthraquinone which colors cellulose acetate textile materials red-blue shades is obtained.

EXAMPLE 33

42. grams of 1-2,2-difluoroethylamino-2-trifluoromethyl-4-bromoanthraquinone, 500 cc. of n-amyl alcohol, 1 gram of copper sulfate, 15 grams of potassium acetate and 29 grams of p-aminophenyl-β-methoxy-β-ethoxy - β - ethoxyethyl ether are heated together and the reaction mixture is worked up as described in Example 1 to obtain 1 - 2,2 - difluoroethylamino-2-trifluoromethyl-4-(p-β - methoxy - β - ethoxy-β-ethoxyethoxyphenyl) aminoanthraquinone which colors cellulose acetate textile materials blue shades.

By the use of 29 grams of m-aminophenyl-β-methoxy-β-ethoxy-β-ethoxyethyl ether in place of p-aminophenyl-β-methoxy-β-ethoxy-β-ethoxyethyl ether in the foregoing example 1-2,2-difluoroethylamino-2-trifluoromethyl - 4 - (m - β-methoxy-β-ethoxy-β-ethoxyethoxyphenyl) aminoanthraquinone which colors cellulose acetate textile materials blue shades is obtained.

EXAMPLE 34

43 grams of 1-2,2,2-trifluoroethylamino-2-trifluoromethyl-4-bromoanthraquinone, 500 cc. of n-amyl alcohol, 1 gram of copper sulfate 15 grams of potassium acetate and 29 grams of p-aminophenyl-β-methoxy-β-ethoxy-β-ethoxyethyl ether are heated together and the reaction mixture is worked up as described in Example 1 to obtain 1-2,2,2-trifluoroethylamino-2 - trifluormethyl - 4-(p-β-methoxy-β-ethoxy-β- ethoxyethoxyphenyl) aminoanthraquinone which colors cellulose acetate textile materials red-blue shades.

By the use of 29 grams of m-aminophenyl-β-methoxy-β-ethoxy-β-ethoxyethyl ether in place of p-aminophenyl-β-methoxy-β-ethoxy-β - ethoxyethyl ether in the foregoing example 1-2,2,2-trifluoroethylamino-2-trifluoromethyl-4-(m - β-methoxy-β-ethoxy-β-ethoxyethoxyphenyl) aminoanthraquinone which colors cellulose acetate textile materials red-blue shades is obtained.

EXAMPLE 35

42.2 grams of 1-2,2-difluoroethylamino-2-trifluoromethyl-4-bromoanthraquinone, 500 cc. of n-amyl alcohol, 1 gram of copper sulfate, 15 grams of potassium acetate and 30 grams of p-aminophenyl-β-ethoxy-β-ethoxy-β - ethoxyethyl ether are heated together and the reaction mixture is worked up as described in Example 1 to obtain 1-2,2-difluoroethylamino-2-trifluoromethyl-4-(p-β-ethoxy-β - ethoxy - β - ethoxyethoxyphenyl) aminoanthraquinone which colors cellulose acetate textile materials blue shades. The dye compound obtained has the formula:

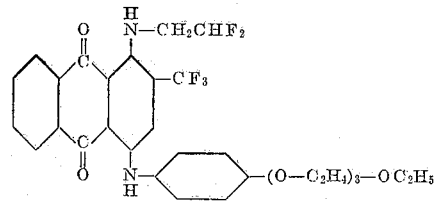

By the use of 43 grams of 1-2,2,2-trifluoroethylamino-2-trifluoromethyl - 4 - bromoanthraquinone in place of 1-2,2-difluoroethylamino-2-trifluoromethyl-4-bromoanthraquinone in the foregoing example 1-2,2,2-trifluoroethylamino-2-trifluoromethyl-4-(p-β-ethoxy-β - ethoxy - β - ethoxyethoxyphenyl) aminoanthraquinone which colors cellulose acetate textile materials blue shades is obtained.

EXAMPLE 36

46 grams of 1-3,3,3-trifluoropropylamino-2-trifluoromethyl-4-bromoanthraquinone, 500 cc. of n-amyl alcohol, 1 gram of copper sulfate, 15 grams of potassium acetate and 26.5 grams of o-aminophenyl-β-methoxy-β-ethoxyethyl ether are heated together and the reaction mixture is worked up as described in Example 1 to obtain 1-3,3,3,-trifluoropropylamino - 2 - trifluoromethyl-4-(o-β-methoxy - β - ethoxyethoxyphenyl) aminoanthraquinone which colors cellulose acetate textile materials blue shades.

By the use of 26.5 grams of p-aminophenyl-β-methoxy-β-ethoxyethyl ether in place of o-aminophenyl-β-methoxy-β-ethoxyethyl ether in the foregoing example 1-3,3,3,-trifluoropropylamino-2-trifluoromethyl-4-(p-β-methoxy - β - ethoxyethoxyphenyl) aminoanthraquinone which colors cellulose acetate textile materials blue shades is obtained.

EXAMPLE 37

44.5 grams of 1-α-difluoromethylethylamino-2-trifluoromethyl-4-bromoanthraquinone, 500 cc. of n-amyl alcohol, 1 gram of copper sulfate, 15 grams of potassium acetate and 30 grams of o-aminophenyl - β-ethoxy-β-ethoxy-β-ethoxyethyl ether are heated together and the reaction mixture is worked up as described in Example 1 to obtain 1-α-difluoromethylethylamino-2-trifluoromethyl - 4 - (o - β - ethoxy-β-ethoxy-β-ethoxyethoxyphenyl) aminoanthraquinone which colors cellulose acetate textile materials blue shades.

By the use of 28 grams of p-aminophenyl-β-ethoxy-β-ethoxyethyl ether in place of o-aminophenyl-β-ethoxy-β-ethoxy-β-ethoxyethyl ether in the foregoing example 1-α-difluoromethylethylamino - 2 - trifluoromethyl - 4-(p-β-ethoxy-β-ethoxyethoxyphenyl) aminoanthraquinone which colors cellulose acetate textile materials blue shades is obtained.

EXAMPLE 38

46 grams of 1-α-trifluoromethylethylamino-2-trifluoromethyl-4-bromoanthraquinone, 500 cc. of n-amyl alcohol, 1 gram of copper sulfate, 15 grams of potassium acetate and 30 grams of p-aminophenyl - β-ethoxy-β-ethoxy-β-ethoxyethyl ether are heated together and the reaction mixture is worked up as described in Example 1 to obtain 1-α - trifluoromethylethylamino-2-trifluoromethyl - 4 - (p-β-ethoxy-β-ethoxy-β-ethoxyethoxyphenyl) aminoanthraquinone which colors cellulose acetate textile materials red-blue shades.

By the use of 28 grams of o-aminophenyl-β-ethoxy-β-ethoxyethyl ether in place of p-aminophenyl-β-ethoxy-β-ethoxy-β-ethoxyethyl ether in the foregoing example 1-α-trifluoromethylethylamino - 2 - trifluoromethyl - 4-(o-β-ethoxy-β-ethoxyethoxyphenyl) aminoanthraquinone which colors cellulose acetate textile materials red-blue shades is obtained.

EXAMPLE 39

46 grams of 1-3,3-difluorobutylamino-2-trifluoromethyl-4-bromoanthraquinone, 500 cc. of n-amyl alcohol, 1 gram of copper sulfate, 15 grams of potassium acetate and 30 grams of o-aminophenyl - β - ethoxy - β-ethoxy-β-ethoxyethyl ether are heated together and the reaction mixture is worked up as described in Example 1 to obtain 1-3,3-difluorobutylamino-2-trifluoromethyl - 4 - (o - β-ethoxy-β-ethoxy-β-ethoxyethoxyphenyl) aminoanthraquinone which colors cellulose acetate textile materials greenish-blue shades.

By the use of 29 grams of p-aminophenyl-β-methoxy-β-ethoxy-β-ethoxyethyl ether in place of o-aminophenyl-β-ethoxy-β-ethoxy-β-ethoxyethyl ether in the foregoing example 1-3,3-difluorobutylamino - 2-trifluoromethyl-4-(p-β-methoxy-β-ethoxy-β-ethoxyethoxyphenyl) aminoanthraquinone which colors cellulose acetate textile materials greenish-blue shades is obtained.

EXAMPLE 40

44.5 grams of 1-2,2-difluoropropylamino-2-trifluoromethyl-4-bromoanthraquinone, 500 cc. of n-amyl alcohol, 1 gram of copper sulfate, 15 grams of potassium acetate and 28 grams of p-aminophenyl-β-ethoxy-β-ethoxyethyl ether are heated together and the reaction mixture is worked up as described in Example 1 to obtain 1-2,2 - difluoropropylamino-2-trifluoromethyl-4-(p - β - ethoxy-β-ethoxyethoxyphenyl) aminoanthraquinone which colors cellulose acetate textile materials blue shades.

By the use of 26.5 grams of o-aminophenyl-β-methoxy-β-ethoxyethyl ether in place of p-aminophenyl-β-ethoxy-β-ethoxyethyl ether in the foregoing example 1-2,2-difluoropropylamino-2 - trifluoromethyl - 4 - (o-β-methoxy-β-ethoxyethoxyphenyl) aminoanthraquinone which colors cellulose acetate textile materials blue shades is obtained.

EXAMPLE 41

44.5 grams of 3,3-difluoropropylamino-2-trifluoromethyl-4-bromoanthraquinone, 500 cc. of n-amyl alcohol, 1 gram of copper sulfate, 15 grams of potassium acetate and 24 grams of o-aminophenyl-β-hydroxy-β-ethoxyethyl ether are heated together and the reaction mixture is worked up as described in Example 1 to obtain 1-3,3 - difluoropropylamino - 2-trifluoromethyl-4-(o-β-hydroxy-β-ethoxyethoxyphenyl) aminoanthraquinone which colors cellulose acetate textile materials greenish-blue shades.

By the use of 24 grams of p-aminophenyl-β-hydroxy-β-ethoxyethyl ether in place of o-aminophenyl-β-hydroxy-β-ethoxyethyl ether in the foregoing example 1-3,3-difluoropropylamino-2-trifluoromethyl - 4 - (p - β - hydroxy-β-ethoxyethoxyphenyl) aminoanthraquinone which colors cellulose acetate textile materials greenish-blue shades is obtained.

EXAMPLE 42

44.5 grams of 1-3,3-difluoropropylamino-2-trifluoromethyl-4-bromoanthraquinone, 500 cc. of n-amyl alcohol, 1 gram of copper sulfate, 15 grams of potassium acetate and 30 grams of p-aminophenyl - β - ethoxy-β-ethoxy-β-ethoxyethyl ether are heated together and the reaction mixture is worked up as described in Example 1 to obtain 1-3,3 - difluoropropylamino - 2 - trifluoromethyl-4-(p-β-ethoxy-β-ethoxy-β-ethoxyethoxyphenyl) aminoanthraquinone which colors cellulose acetate textile materials greenish-blue shades.

By the use of 26.5 grams of o-aminophenyl-β-methoxy-β-ethoxyethyl ether in place of p-aminophenyl - β - ethoxy-β-ethoxy-β-ethoxyethyl ether in the foregoing example 1-3,3-difluoropropylamino - 2 - trifluoromethyl - 4 - (o-β-methoxy-β-ethoxyethoxyphenyl) aminoanthraquinone which colors cellulose acetate textile materials greenish-blue shades is obtained.

The expression "are heated together and the reaction mixture is worked up as described in Example 1" which appears in the foregoing examples is intended to mean that the reactants are heated as described in Example 1 and that the reaction mixture resulting is worked up as described in Example 1. That is, both the heating and recovery operations are performed in the manner set forth in Example 1.

Many but not all of the limited number of compounds of our invention have been specifically disclosed in the foregoing examples. However, it is to be clearly understood that any of the members represented by R can be present in the compound with any of the members represented by $R_1$ and for any value of $n$. In other words, all the limited number of compounds within the ambit of our invention can be prepared in accordance with the general disclosure given herein supplemented by the numerous examples illustrating the manner in which the compounds of our invention are prepared.

The term copper sulfate as used in the foregoing examples is intended to mean $CuSO_4.5H_2O$.

In order that the preparation of the anthraquinone compounds of our invention may be entirely clear, the preparation of various intermediate compounds used in their manufacture is described hereinafter.

Compounds having the formula:

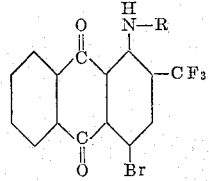

I wherein R has the meaning previously assigned to it are prepared by brominating a compound having the formula:

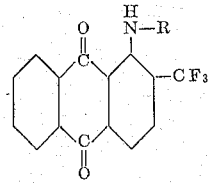

II wherein R has the meaning previously assigned to it. The bromination is carried out in an inert diluent such as pyridine at a temperature of about 100° C. using bromine as the brominating agent. Preferably an excess (5–10 per cent) of bromine is employed. The time required for the bromination is ordinarily 5 to 6 hours. The process will be illustrated with reference to the preparation of 1-2,2,2-trifluoroethylamino-2-trifluoromethyl-4-bromoanthraquinone.

EXAMPLE A 17 grams of 1-2,2,2-trifluoroethylamino-2-trifluoromethylanthraquinone are dissolved in 200 cc. of pyridine and brominated on the steam bath in the presence of 9 grams of sodium acetate with 9 grams of bromine. The reaction mixture is heated on the steam bath for 5 to 6 hours and then filtered while hot. About half of the pyridine is distilled from the filtrate. Upon cooling 1-2,2,2-trifluoroethylamino - 2 - trifluoromethyl-4-bromoanthraquinone precipitates out and is recovered by filtrate. It is purified by recrystallization from pyridine. It colors cellulose acetate textile materials orange shades.

Using the procedure just described, the other compounds having the Formula I are prepared. To illustrate, 1 - 2,2 - difluoroethylamino-2-trifluoromethyl - 4 - bromoanthraquinone, 1-3,3-difluorobutylamino - 2 - trifluoromethyl-4-bromoanthraquinone and 1-3,3,3-trifluoropropylamino- 2-trifluoromethyl-4-bromoanthraquinone, for example, are prepared by brominating 1-2,2-difluoroethylamino - 2 - trifluoromethylanthraquinone, 1-3,3-difluorobutylamino-2-trifluoromethylanthraquinone and 1 - 3,3,3 - trifluoropropylamino-2-trifluoromethylanthraquinone, respectively, in accordance with the procedure just described. Potassium acetate can be used in place of sodium acetate in the above-described bromination reaction.

Compounds having the Formula II are preprepared by reacting 1-chloro-2-trifluoromethylanthraquinone with a primary amine having the formula:

H₂N—R wherein R has the meaning previously assigned to it. The following example is illustrative of the manner in which compounds having the Formula II are prepared.

EXAMPLE B 30.6 parts of 1-chloro-2-trifluoromethylanthraquinone, 250 parts of pyridine and 15 parts of 2,2,2-trifluoroethylamine in 20 parts of water are mixed and heated together in a shaking autoclave for 6 hours at 190° C.–225° C. The reaction mixture is removed from the autoclave when it has cooled to a temperature of about 75° C. and allowed to cool to room temperature. Upon cooling, 1-2,2,2-trifluoroethylamino-2-trifluoromethylanthraquinone crystallizes out and is recovered by filtration, washed well with water and dried.

By the use of an equivalent molecular weight of another amine of the formula:

H₂N—R wherein R has the meaning previously assigned to it, the other compounds of the Formula II are readily obtained. Thus by the use of 2,2-difluoroethylamine, 3,3-difluorobutylamine and 3,3,3-trifluoropropylamine, respectively, 1-2,2-difluoroethylamino - 2 - trifluoromethylanthraquinone, 1 - 3,3 - difluorobutylamino-2-trifluoromethylanthraquinone and 1-3,3,3-trifluoropropylamino-2-trifluoromethylanthraquinone, respectively, are obtained.

Certain amines of the formula:

H₂N—R wherein R has the meaning previously assigned to it are new compounds. The preparation of these new compounds is described hereinafter.

In general, the above-identified amine compounds are prepared by reacting concentrated aqueous ammonia with a fluorinated alkyl halide (Cl, Br or I) compound corresponding to the amine compound to be prepared. 2,2,2-trifluoroethylamine and 3,3,3-trifluoropropylamine are specifically disclosed in U. S. Patent 2,348,321. The example given in this patent is illustrative of the manner in which the reaction between the fluorinated alkyl halide and ammonia is carried out. Ordinarily, the fluorinated alkyl halide employed is a fluorinated alkyl chloride.

2,2-difluoroethylamine is disclosed in Bull. Sci. Acad. Roy. Belg., page 762 (1904). It can also be prepared by reacting CHF₂CH₂Cl, CHF₂CH₂Br or CHF₂CH₂I (all known compounds) with aqueous ammonia. Similarly, 3,3-difluorobutylamine can be prepared by reacting the known compound CH₃CF₂CH₂CH₂Cl with aqueous ammonia. The reactions just referred to can be carried out in accordance with the general procedure described in U. S. Patent 2,348,321.

*Preparation of 2,2-difluoropropylamine*

48 grams of CH₃CF₂CH₂Br, J. A. C. S., vol. 59, page 2434 (1937), are heated with 200 cc. of 28% aqueous ammonia and 1 gram of a wetting agent such as Nacconol NR (sodium alkyl naphthalene sulfonate) in a shaking autoclave at 130° C.–150° C. for 24 hours. The reaction mixture is then carefully distilled through an efficient fractionating column, NH₃ gas coming off first. The amine fraction distilling over from 60° C.–85° C. is then collected and dried over solid NaOH and then finally redistilled from fresh solid NaOH. 2,2-difluoropropylamine distills over at 75° C.–77° C. and has a refractive index of $N_D^{25}$ 1.3622. It is a water-white liquid miscible with water and with other ordinary organic solvents and has a characteristic amine odor.

34.6 grams of CH₃CF₂CH₂Cl can be substituted for the CH₃CF₂CH₂Br of the foregoing example.

*Preparation of 3,3-difluoropropylamine*

130 grams of 1,1-difluoro-3-bromopropane,

CHF₂CH₂CH₂Br and 328 cc. of 28% aqueous ammonia were heated with shaking in an autoclave at 110° C.–120° C. for 24 hours. The autoclave was then cooled and the cooled contents were removed and poured into 5 gram moles of cold hydrochloric acid, filtered and evaporated to dryness on a water bath and under 20–30 mm. pressure. The amine salts formed were then separated from the ammonium chloride formed by extraction with 8 200 cc. portions of absolute ethyl alcohol. The ethyl alcohol solution was evaporated to dryness and treated with an aqueous solution of potassium hydroxide. (150 grams KOH and 150 cc. water.) The reaction mixture separated into two layers and was extracted with ethyl ether and dried. On distillation of the ether extract, there was obtained: (1) 3,3-difluoropropylamine which boils at 92° C.–94° C. at 760 mm. and which has a refractive index of $N_D^{20}$ 1.3650 and (2) bis-3,3-difluoropropylamine which boils at 91° C.–94° C. at 50 mm. and which has a refractive index of $N_D^{20}$ 1.3744. Both are colorless liquids.

|  | Calculated | Found |
|---|---|---|
| Analysis of (1): | | |
| C | 37.9 | 36.8 |
| H | 7.4 | 7.9 |
| N | 14.7 | 13.7 |
| Analysis of (2): | | |
| C | 41.6 | 42.0 |
| H | 6.4 | 6.6 |
| N | 8.1 | 7.9 |

*Preparation of 1,1,1-trifluoro-2-aminopropane*

1,1,1-trifluoroacetone was heated in an autoclave at 90° C.–100° C. for 5 hours with a water solution of hydroxylamine hydrochloride and sodium acetate to form the oxime. The process is substantially the same as that employed by Swarts, Bull. Sci. Acad. Roy. Belg., page 178 (1927).

25 grams of the oxime reaction product obtained as just described was hydrogenated in ethyl ether in an autoclave under 2000 pounds hydrogen pressure using Raney nickel as a catalyst. Upon completion of the hydrogenation reaction the ether solution was filtered and the filtrate was acidified with ethereal hydrogen chloride to obtain 1,1,1-trifluoro-2-aminopropane in its hydrochloride form, which was recrystallized from its solution in ethyl alcohol-ethyl ether.

Calculated for $C_3H_7ClF_3N$: C, 24.4; H, 4.7; N, 9.4. Found: C, 24.3; H, 4.6; N, 9.3.

The free amine was obtained from the amine hydrochloride by treating with an aqueous 50% KOH solution and distilling off the amine. It boils at 46° C.–47° C. at 760 mm. and has a refractive index of $N_D^{20}$ 1 3210.

1,1,1-trifluoro-2-aminopropane can also be prepared by reacting $CF_3CHBrCH_3$ with concentrated aqueous ammonia in an autoclave.

*Preparation of 1,1-difluoro-2-aminopropane*

($CHF_2CHCH_3$)

This compound is prepared in accordance with the procedure described in connection with 1,1,1-trifluoro-2-aminopropane. That is, difluoroacetone, $CHF_2COCH_3$ is converted to the oxime by treatment with a water solution of hydroxylamine hydrochloride and sodium acetate and the oxime is converted to 1,1-difluoro-2-aminopropane in accordance with the procedure used in the case of 1,1,1-trifluoro-2-aminopropane.

1,1-difluoro-2-aminopropane can also be prepared by reacting $CHF_2CHBrCH_3$ with concentrated aqueous ammonia in an autoclave.

*Preparation of 3,3-difluorobutylamine*

32.1 grams of 1-chloro-3,3-difluorobutane were placed in the glass liner of an autoclave together with 102 cc. (1.5 gram mole) of aqueous ammonia. The reactants were heated at 120° C.–125° C. with shaking for 24 hours.

The autoclave was then cooled and the contents neutralized by pouring into a small excess of iced dilute hydrochloric acid. The reaction mixture resulting was then distilled and concentrated to dryness on a steam bath under reduced pressure.

The dry residue of the amine hydrochloride and ammonium chloride was extracted four times with hot absolute ethyl alcohol. This treatment separates the alcohol-soluble amine hydrochloride from the insoluble ammonium chloride. The alcohol extracts were concentrated to dryness yielding 25.4 grams (70%) of

$CH_3CF_2CH_2CH_2NH_2.HCl$ which were further purified by crystallization from ethyl alcohol-ethyl ether.

The free amine was obtained by heating the amine hydrochloride with an excess of dimethyl aniline and distilling off the amine.

*Preparation of 1,1-difluoro-3-bromopropane*

98 grams of 1,1,3-tribromopropane ($CHBr_2CH_2CH_2Br$)

were placed in a 200 cc. round bottomed flask fitted with a still-head and a well-cooled receiving flask. 107 grams of dry mercuric fluoride were added to the reaction flask which was then heated gently with a free flame until reaction began. The reaction was then allowed to proceed briskly but not too vigorously (by cooling or heating as required) until all the reaction product had distilled over at about 85° C.–100° C. The crude product was then steam-distilled, dried and fractionated by distillation under reduced pressure. The main product obtained was 1,1-difluoro-3-bromopropane ($CHF_2CH_2CH_2Br$) having a boiling point of 92°–94° C. A yield of 35–40% of pure product was obtained. A small amount of $CH_2FCH_2CH_2Br$ was present in the still residue.

Compounds having the formula:

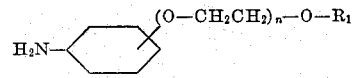

wherein $n$ and $R_1$ have the meaning previously assigned to them and wherein the $$-(O-CH_2CH_2)_n-O-R_1$$

group is in ortho or para position to the $-NH_2$ group, are prepared by condensing a chloronitrobenzene compound of the formula:

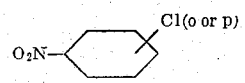

with a sodium alcoholate of the formula:

$$Na-(O-CH_2CH_2)_n-O-R_1$$

wherein $n$ and $R_1$ have the meaning previously assigned to them and then reducing the resulting nitro compound with hydrogen, in the presence of a nickel catalyst, especially of the Raney type, in methanol, at from 80° C. to 100° C. in an autoclave under a hydrogen pressure of 400 to 1800 pounds per square inch. The initial condensation of the chloronitrobenzene compound and the sodium alcoholate is advantageously carried out at 90° C. to 100° C. for about 20 hours.

The sodium alcoholates are prepared by adding sodium to the alcohols of the formula:

$$H-(O-CH_2CH_2)_n-O-R_1$$

wherein $n$ and $R_1$ have the meaning previously assigned to them. These alcohols, i. e. diethylene glycol and triethylene glycol and the monomethyl and monoethyl ethers of these glycols, are very well-known substances and are readily available on the market.

The above process will be illustrated with reference to the preparation of o-aminophenyl-β-hydroxy-β-ethoxy-β-ethoxyethyl ether.

EXAMPLE C

*o - Nitrophenyl - β - hydroxy - β - ethoxy - β - ethoxyethyl ether*

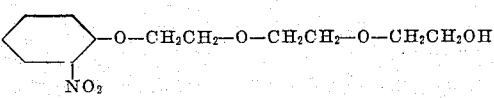

2635 g. of triethylene glycol (B. P. 141–143° C./4 mm.) are placed in a 5-liter 3-necked flask equipped with a mechanical stirrer, air condenser protected by a calcium chloride tube, a thermometer, and an addition tube for solids. Stirring is started and the temperature of the triethylene glycol raised to 90° C. The source of heat is then removed, and 101 g. of metallic sodium cut into ⅜″ squares are added over a period of about two hours, keeping the temperature at 105–115° C.

When all the sodium has reacted, the flask is cooled to 85–90° C., and 693 g. of o-nitrochlorobenzene is added in 40–50 g. portions over a period of two hours, keeping the temperature at 100–110° C. The first few additions of o-nitrochlororobenzene usually cause vigorous reaction, but a noticeable rise in temperature should be observed with each addition, thus avoiding the danger of an accumulation of unreacted material with a consequent uncontrollable reaction later on. After this addition is complete, the reaction mixture is heated on a steam bath for about 16 hours with stirring.

The reaction mixture is then allowed to cool to 50–60° C. and is poured into 3.5 liters of water at room temperature. This relatively small amount of water thins out the reaction mixture and dissolves the salt without causing the product, which is a liquid at room temperature, to separate out appreciably. The o-nitrophenyl-$\beta$-hydroxy-$\beta$-ethoxyethyl ether is then extracted from the water-triethylene glycol mixture with four 1500 cc. portions of benzene. These combined benzene extracts are washed once with a small amount of water to remove any salt and the benzene removed by distillation. The yield of o-nitrophenyl-$\beta$-hydroxy-$\beta$-ethoxy-$\beta$-ethoxyethyl ether ranges from 913 to 1003 g. (76.5–84%). It is a viscous red-brown oil. When the nitro compound is to be reduced, only part of the benzene need be removed by distillation as the reduction can be carried out in benzene solution.

*o - Aminophenyl - $\beta$ - hydroxy - $\beta$ - ethoxy - $\beta$ - ethoxyethyl ether*

457 gms. of o-nitrophenyl-$\beta$-hydroxy-$\beta$-ethoxy-$\beta$-ethoxyethyl ether prepared as described above were placed in a shaking autoclave together with 450 cc. of ethyl alcohol and 7.5 grams of Raney nickel. The reduction reaction was carried out with shaking at 90° C.–105° C. and 1500 lbs. per square inch hydrogen pressure. The reaction product from two runs as described above was filtered to remove the Raney nickel and the ethyl alcohol was removed by distillation. The desired product was then recovered by distilling the remainder of the reaction mixture under reduced pressure. The yield of product (B. P. 205° C.–210° C./3.5 mm.) was 648 grams or 80% of the theoretical.

Compounds having the formula:

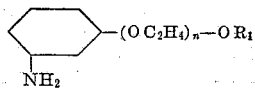

are obtained by reduction of the corresponding nitro compound. This reduction can conveniently be carried out at a temperature of 75° C.–100° C. with hydrogen under pressure in the presence of Raney nickel as a catalyst in the presence of an inert solvent or diluent such as ethyl alcohol.

Compounds having the formula:

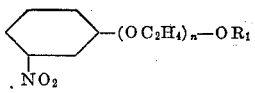

are obtained by reacting a compound having the formula:

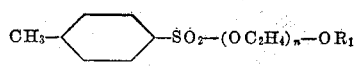

with m-nitrophenol in its sodium or potassium salt form. These latter compounds are in turn obtained by reacting a compound having the formula:

with p-toluenesulfonyl chloride. The members $n$ and $R_1$ as used here and throughout the specification have the meaning previously assigned to them. The series of reaction just referred to will be ilustrated with reference to m-aminophenyl-$\beta$-hydroxy-$\beta$-ethoxy-$\beta$-ethoxyethyl ether.

*m - Nitrophenyl - $\beta$ - hydroxy - $\beta$ - ethoxy - $\beta$ - ethoxyethyl ether*

107 grams of triethylene glycol-p-toluene sulfonate,

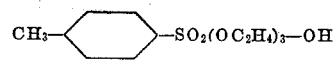

49 grams of m-nitrophenol, 14 grams of NaOH and 127 cc. of water were heated to boiling for 6 hours. Then 200 cc. of water were added and the insoluble liquid which formed was separated in a separatory funnel and washed twice with $H_2O$. Upon crystallization from ethyl alcohol, 33 grams of crystals melting at 83° C.–85° C. were obtained.

*m - Aminophenyl - $\beta$ - hydroxy - $\beta$ - ethoxy - $\beta$ - ethoxyethyl ether*

33 grams of m-nitrophenyl-$\beta$-hydroxy-$\beta$-ethoxy-$\beta$-ethoxyethyl ether were obtained as described above and were dissolved in 50 cc. of ethyl alcohol and placed in a shaking autoclave. The compound was then reduced under 1500 lbs. hydrogen pressure at 75° C.–100° C. for 3–4 hours. The reaction mixture was then cooled, filtered, and the filtrate distilled under reduced pressure to recover the m-aminophenyl-$\beta$-hydroxy-$\beta$-ethoxy-$\beta$-ethoxyethyl ether which boils at 195° C.–205° C/2½ mm.

*p-Triethyleneglycol-p-toluene sulfonate*

236 grams of triethylene glycol and 75 grams of p-toluene sulfonyl chloride were placed in a 2 liter 3-necked flask equipped with a stirrer, thermometer and dropping funnel. Then 157 cc. of 5 N NaOH were added dropwise, with stirring, at such a rate that the temperature (external cooling was employed) remained below 15° C. After the addition of the NaOH, another 75 grams of p-toluene sulfonyl chloride were added to the reaction mixture and another 157 cc. of 5 N NaOH were added dropwise, with stirring, while maintaining the temperature below 15° C. The reaction mixture was then stirred for 4 hours more. The p-triethylene-glycol-p-toluene sulfonate formed separated slowly as a white plastic solid and was recovered by filtration and dried in a vacuum desiccator. The yield obtained was 45% of the theoretical.

The anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 65°–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45°–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The anthraquinone compounds having the formula:

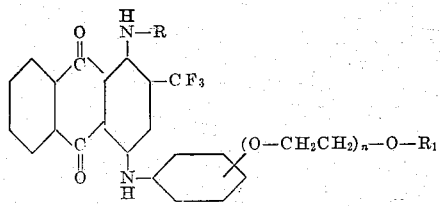

wherein R represents a member selected from the group consisting of a 2,2-difluoroethyl group, a 2,2-difluoropropyl group, a 3,3-difluoropropyl group, a 3,3-difluorobutyl group, a 2,2,2-trifluoroethyl group, a 3,3,3-trifluoropropyl group, an α-difluoromethylethyl group and an α-trifluoromethylethyl group, $R_1$ represents a member selected from the group consisting of a hydrogen atom and an alkyl hydrocarbon group having from one to two, inclusive, carbon atoms and $n$ represents a small whole integer of from two to three, inclusive.

2. The anthraquinone compounds having the formula:

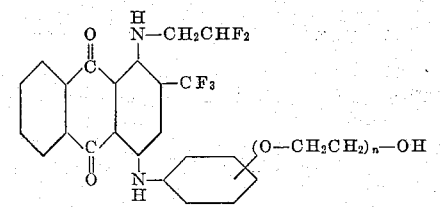

wherein $n$ represents a small whole integer of from two to three, inclusive.

3. The anthraquinone compounds having the formula:

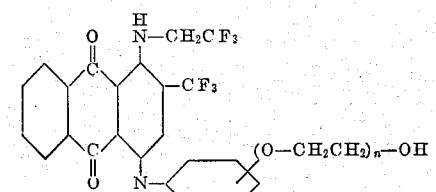

wherein $n$ represents a small whole integer of from two to three, inclusive.

4. The anthraquinone compound having the formula:

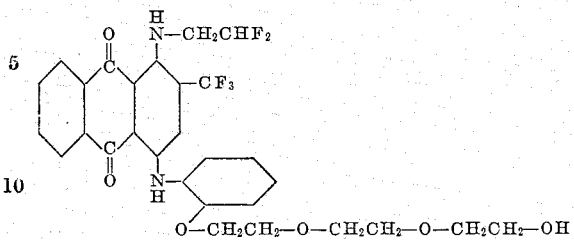

5. The anthraquinone compound having the formula:

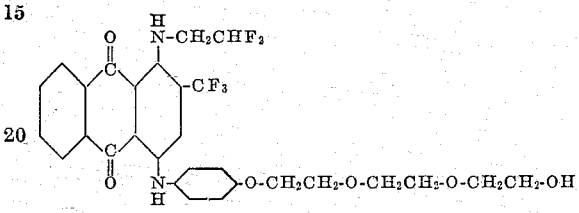

6. The anthraquinone compound having the formula:

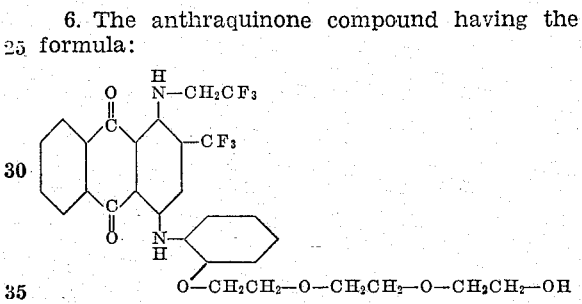

JOSEPH B. DICKEY.
EDMUND B. TOWNE.

REFERENCES CITED

The following references are of record in the file of this patent:

UNITED STATES PATENTS

| Number | Name | Date |
|---|---|---|
| 2,061,186 | Cole | Nov. 17, 1936 |
| 2,085,736 | Calcott et al. | July 6, 1937 |
| 2,174,182 | Schlichenmaier et al. | Sept. 26, 1939 |
| 2,326,047 | McNally et al. | Aug. 3, 1943 |
| 2,333,402 | Wuertz et al. | Nov. 2, 1943 |
| 2,338,908 | Dickey et al. | Jan. 11, 1944 |
| 2,451,478 | Dickey et al. | Oct. 19, 1948 |

OTHER REFERENCES

Gilman, ed.: "Organic Chemistry" (2nd ed., 1943), vol. I, pp. 956, 960, 963.